(12) United States Patent
Juul

(10) Patent No.: US 12,295,382 B2
(45) Date of Patent: May 13, 2025

(54) COCOA BUTTER TOLERANT FAT COMPOSITION

(71) Applicant: AAK AB (PUBL), Malmö (SE)

(72) Inventor: Bjarne Juul, Højbjerg (DK)

(73) Assignee: AAK AB (PUBL), Malmö (SE)

( * ) Notice: Subject to any disclaimer, the term of this patent is extended or adjusted under 35 U.S.C. 154(b) by 639 days.

(21) Appl. No.: 17/604,883

(22) PCT Filed: May 1, 2020

(86) PCT No.: PCT/EP2020/062184
§ 371 (c)(1),
(2) Date: Oct. 19, 2021

(87) PCT Pub. No.: WO2020/225144
PCT Pub. Date: Nov. 12, 2020

(65) Prior Publication Data
US 2022/0211069 A1 Jul. 7, 2022

(30) Foreign Application Priority Data

May 3, 2019 (SE) .................................... 1950526-2

(51) Int. Cl.
| | | |
|---|---|---|
| *A23G 1/30* | (2006.01) | |
| *A23D 9/00* | (2006.01) | |
| *A23G 1/36* | (2006.01) | |
| *A23G 3/40* | (2006.01) | |

(52) U.S. Cl.
CPC .............. *A23G 1/305* (2013.01); *A23D 9/00* (2013.01); *A23G 1/36* (2013.01); *A23G 3/40* (2013.01)

(58) Field of Classification Search
None
See application file for complete search history.

(56) References Cited

U.S. PATENT DOCUMENTS

| | | |
|---|---|---|
| 4,876,107 A | 10/1989 | King et al. |
| 5,405,639 A | 4/1995 | Pierce et al. |
| 5,424,091 A | 6/1995 | Cain et al. |
| 2018/0030485 A1 | 2/2018 | Watanabe |

FOREIGN PATENT DOCUMENTS

| | | |
|---|---|---|
| CN | 103907736 A | 7/2014 |
| EP | 0 545 463 A1 | 6/1993 |
| JP | H04135453 A | 5/1992 |
| JP | 2002/065162 A | 3/2002 |
| RU | 2 303 363 C2 | 7/2007 |
| RU | 2 390 157 C2 | 5/2010 |
| RU | 2 569 479 C2 | 11/2015 |
| WO | WO 2016/125791 A1 | 8/2016 |
| WO | WO 2017/179455 A1 | 10/2017 |
| WO | WO 2018/117950 A1 | 6/2018 |

OTHER PUBLICATIONS

International Search Report for International Application No. PCT/EP2020/062184, dated Sep. 7, 2020.
Koyano et al., "Physical Properties of Equally Mixed Systems of 1,3-Dioleoyl-2-strearoylglycerol/Cocoa Butter and 1,3-Dioleoyl-2-stearoylglycerol-added Dark Chocolate," (1993).
Written Opinion of the International Search Authority for International Application No. PCT/EP2020/062184.

*Primary Examiner* — Jyoti Chawla
(74) *Attorney, Agent, or Firm* — Finnegan, Henderson, Farabow, Garrett & Dunner, LLP

(57) ABSTRACT

Disclosed is a fat composition comprising saturated fatty acids, symmetrical OStO triglycerides, and $Sat_2O$ triglycerides selected from StStO, StOSt, POP, PPO, POSt, StPO and/or PStO. The fat composition has a ratio between asymmetrical di-saturated triglyceride and symmetrical di-saturated triglyceride of at least 0.7. Further disclosed is a compound comprising such a fat composition and the use of such a fat composition in manufacturing of compounds and chocolate-like products, especially for human consumption.

16 Claims, No Drawings

COCOA BUTTER TOLERANT FAT COMPOSITION

This application is a national stage filing under 35 U.S.C. § 371 of International Application No. PCT/EP2020/062184, filed on May 1, 2020, which claims the benefit of the filing date of Swedish Patent Application No. 1950526-2, filed on May 3, 2019, each of which is incorporated herein by reference in its entirety.

TECHNICAL FIELD OF THE INVENTION

The present invention relates to a fat composition comprising saturated fatty acids, symmetrical OStO triglycerides, and $Sat_2O$ triglycerides selected from StStO, StOSt, POP, PPO, POSt, StPO and/or PStO, wherein the composition has a ratio between asymmetrical di-saturated triglyceride and symmetrical di-saturated triglyceride of at least 0.7. The present invention further relates to a compound comprising such fat compositions and the use of such fat compositions in manufacturing of compounds and chocolate-like products.

BACKGROUND OF THE INVENTION

When manufacturing confectionary products e.g. chocolate or chocolate-like products it is highly important to produce a product with good bloom stability, good form stability, while at the same time maintaining the characteristic chocolate melting and taste.

In confectionary products, cocoa butter (CB) is a well-known ingredient. The main part of the triglycerides in cocoa butter is of the symmetric SatUSat type (Sat being saturated fatty acids, U being unsaturated fatty acids) or more specifically, StOSt, POSt and POP (P is palmitic acid (C16:0), St is stearic acid (C18:0), O is oleic acid (C18:1)).

Cocoa butter equivalents (CBEs) may be used to exchange part of the cocoa butter in a chocolate recipe. The production of CBEs is based on fractions of fats containing the same triglycerides as CB, e.g. palm oil, shea butter, illipe, etc. By doing so beneficial characteristics can be achieved, characteristics which cannot be achieved using only cocoa butter (CB), e.g. increased bloom stability. A number of standard CBEs already exists on the market. Unfortunately, a compound based on CBE may contain a high cocoa butter tolerance and a lower cost, but at the same time has a much more complicated production line because CBEs need the tempering process and much longer cooling tunnels which may mean a new production line, higher cost, and a less efficient production line.

Alternatively, a cocoa butter replacer (CBR) or a cocoa butter substitute (CBS) may be used. Both CBR and CBS has limited compatibility with cocoa butter; however, they are also both non-temper solutions, i.e. not in need of the tempering process to produce stable compounds.

CBS can usually be mixed with less than 5% CB (or CBE) while CBR can usually be mixed with less than 10% CB (or CBE). The compound industry however needs the cocoa to get the chocolate taste and the compromise has so far been to use cocoa powder with a low cocoa butter content (there is approximately between 10 and 12 wt % CB in cocoa powder) to be able to add cocoa to the compound products to obtain the chocolate taste.

WO2017179455 addresses some of the problem of providing an oil or fat for non-tempering chocolates, which enables the blending of cocoa butter at a high concentration. However, WO2017179455 discloses the need for a lauric non-tempering chocolate. It further discloses adding a USatU-type triglyceride at a proper content to a lauric hard butter. In this manner, the blending of cocoa butter at a high concentration into a chocolate prepared using a lauric hard butter becomes possible.

From the above mentioned, it appears that there is a need for fat compositions, which keeps a recognizable cocoa butter melting profile, which has no waxy taste, and which has good bloom stability. It is preferable that the bloom stability is also present at a lower temperature so that the resulting compound may be stored at lower temperature or transported at lower temperatures without bloom occurring, i.e. bloom resistance is achieved at a relatively lower storage temperatures than normal.

Accordingly, the main object of the invention is to provide fat compositions providing good bloom stability at lower temperatures, such as temperatures at 20° C. or lower.

Another object is to provide higher CB tolerance fat compositions, which has no waxy taste.

SUMMARY OF THE INVENTION

The present invention relates to a fat composition comprising at least 50 wt % saturated (Sat) fatty acids, and wherein in the fat composition:
  a) 0 to 25 wt % is C4-C14 fatty acids,
  b) 0 to 5 wt % is trans unsaturated fatty acids,
  c) 0 to 20 wt % is tri-saturated triglycerides (SatSatSat),
  d) 1 to 20 wt % is symmetrical OStO triglycerides,
  e) 45 to 99 wt % is $Sat_2O$ triglycerides selected from StStO, StOSt, POP, PPO, POSt, StPO and/or PStO, and
  f) the ratio (StStO+PPO+StPO+PStO)/(StOSt+POP+POSt) is at least 0.7.

The present invention therefore relates to a CBR, where the CB tolerance is increased by adding OStO. Hereby it is possible to add more cocoa powder or even small amount of cocoa liquid or cocoa butter to the compound composition and thereby make a more chocolate-like melting and taste without compromising in regard to too short bloom stability, especially at lower storage temperature, such as temperatures at or below 20° C.

The fat composition of the present invention shows a relatively higher cocoa butter tolerance, while at the same time keeping a recognizable cocoa butter melting. Additionally, the fat composition of the present invention has no waxy taste, and further, the fat composition of the present invention shows an improved bloom stability of a resulting compound product.

A higher cocoa butter tolerance will also make the production more flexible regarding cleaning procedures between compound production and chocolate production.

The present invention also relates to a compound comprising a fat mixture comprising cocoa butter and the fat composition according to the present disclosure, wherein the compound comprises 20 to 50 wt % of the fat mixture and wherein the fat mixture comprises 1 to 20% cocoa butter and 80 to 99% fat composition.

Use of the fat composition for the manufacture of a processed food product for human consumption, as well as an ingredient in a confectionary product, as an ingredient in coating compounds for a confectionary product, and/or as an ingredient in a chocolate-like product is also disclosed herein.

Definitions

In the context of the present invention, the following terms are meant to comprise the following, unless defined elsewhere in the description.

Saturated fatty acids (Sat) are chains of carbon atoms joined by single bonds, with the maximum number of hydrogen atoms attached to each carbon atom in the chain. Unsaturated fatty acids are chains of carbon atoms joined by single bonds and varying numbers of double bonds, which do not have their full quota of hydrogen atoms attached. An unsaturated acid can exist in two forms, the cis form and the trans form. A double bond may exhibit one of two possible configurations: trans or cis. In trans configuration (a trans unsaturated fatty acid), the carbon chain extends from opposite sides of the double bond, whereas, in cis configuration (a cis unsaturated fatty acid), the carbon chain extends from the same side of the double bond. The trans unsaturated fatty acid is a straighter molecule. The cis unsaturated fatty acid is a bent molecule.

A tri-saturated triglyceride is a triglyceride comprising three identical or different fatty acids, in which all three fatty acids are saturated fatty acids.

By using the nomenclature CX means that the fatty acid comprises X carbon atoms, e.g. a C14 fatty acid has 14 carbon atoms while a C8 fatty acid has 8 carbon atoms and C4 fatty acids has 4 carbon atoms.

By using the nomenclature CX:Y means that the fatty acid comprises X carbon atoms and Y double bonds, e.g. a C14:0 fatty acid has 14 carbon atoms and 0 double bonds while a C18:1 fatty acid has 18 carbon atoms and 1 double bond.

By a ratio between StStO+PPO+StPO+PStO and StOSt+POP+POSt is meant that the total weight (the sum) of StStO+PPO+StPO+PStO is divided by the total weight (the sum) of StOSt+POP+POSt, i.e. the ratio (StStO+PPO+StPO+PStO)/(StOSt+POP+POSt).

The ratio may be measured/calculated in the composition. A ratio between StStO+PPO+StPO+PStO and StOSt+POP+POSt means that the weight of StStO+PPO+StPO+PStO-triglycerides is divided by the weight of StOSt+POP+POSt —triglycerides, where P is palmitic acid (C16:0), St is stearic acid (C18:0), and O is oleic acid (C18:1 cis-9—cis unsaturated between carbon 9 and 10, counting from the carbonyl group). StStO/PPO/StPO/PStO are asymmetrical di-saturated triglycerides in which a saturated fatty acid (here palmitic acid and/or steric acid) occupies the sn1 and sn2 positions, and an unsaturated fatty acid (here oleic acid) occupies the sn3 position; or a saturated fatty acid (here palmitic acid and/or stearic acid) occupies the sn2 and sn3 positions, and an unsaturated fatty acid (here oleic acid) occupies the sn1 position. StOSt/POP/POSt are symmetrical di-saturated triglycerides in which a saturated fatty acid (here palmitic acid and/or steric acid) occupies the sn1 and sn3 positions, and an unsaturated fatty acid (here oleic acid) occupies the sn2 position.

Sn1/sn2/sn3:

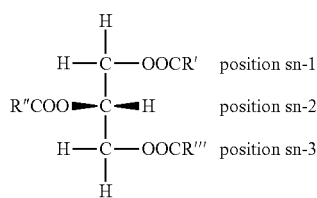

Fischer projection of a natural L-glycerol derivative.

In general, triglycerides use a "sn" notation, which stands for stereospecific numbering. In a Fischer projection of a natural L-glycerol derivative, the secondary hydroxyl group is shown to the left of C-2; the carbon atom above this then becomes C-1 and that below becomes C-3. The prefix 'sn' is placed before the stem name of the compound.

By OStO is meant a symmetrical di-unsaturated triglyceride in which an unsaturated fatty acid (here oleic acid) occupies the sn1 and sn3 positions, and a saturated fatty acid (here steric acid) occupies the sn2 position.

As used herein, "wt %" relates to weight percentage i.e. wt %, wt. % or wt.-%. E.g. by at least 50 wt % saturated fatty acids is meant that at least 50 wt % of the total weight of the fatty acids in the fat composition is from saturated fatty acids and by 1 to 20 wt % symmetrical OStO triglycerides is meant between 1 and 20 wt % of the total weight of the triglycerides in the fat composition is from symmetrical OStO triglycerides. The given weight amounts in the fat composition is calculated from a composition containing approximately 100% triglycerides, however compositions containing up to 10 wt % minor components like free fatty acids, mono- and/or diglycerides may also be included. Further, a fat composition may comprise added milk fat up to 30 wt % which is not accounted for in the calculations herein.

As used herein, the term "and/or" is intended to mean the combined ("and") and the exclusive ("or") use, i.e. "A and/or B" is intended to mean "A alone, or B alone, or A and B together". For example, in the context above "up to 10 wt % mono- and/or diglycerides" is thus intended to mean "up to 10 wt % monoglycerides", "up to 10 wt % diglycerides" or "up to 10 wt % (in total) monoglycerides and diglycerides".

The terms "about", "around", or "approximately" are meant to indicate e.g. the measuring uncertainty commonly experienced in the art, which can be in the order of magnitude of e.g. +/−1, 2, 5, 10%, etc.

As used herein "cocoa butter replacer" (CBR) is intended to mean an edible fat having a triglyceride composition significantly different to cocoa butter. Cocoa butter replacers can have from high to low and even no trans fatty acids in its triglyceride composition. Cocoa butter replacers are only mixable with cocoa butter in medium to small ratios. Furthermore, in contrast to chocolate, cocoa butter replacer based compounds do not need to undergo a treatment at different temperatures, known as tempering, prior to molding, coating, or enrobing, in order to obtain a final product with acceptable shelf life.

As used herein "edible" or "human consumption" is something that is suitable for use as food or as part of a food product, such as a dairy or confectionary product.

For products and methods in the confectionery areas, reference is made to "Chocolate, Cocoa and Confectionery", B. W. Minifie, Aspen Publishers Inc., 3. Edition 1999.

A food product is a product for human consumption. An important group of products is those where cocoa butter and cocoa butter-like fats are used.

By compound is meant a product made from a combination of cocoa butter and (vegetable) fats. A compound may also comprise milk fat in various amounts. It is used as a lower-cost alternative to true chocolate, as it uses less-expensive hard vegetable fats in place of the more expensive cocoa butter. It may also be known as "compound coating" or "chocolatey coating" when used as a coating for confectionary or candy.

By a chocolate-like product is meant a product, which at least is experienced by the consumer as chocolate or as a confectionery product having sensorial attributes common with chocolate, such as e.g. melting profile, taste etc. Some chocolate comprises cocoa butter, typically in substantial amounts, where some chocolate-like product may be produced with a low amount of or even without cocoa butter, e.g. by replacing the cocoa butter with a cocoa butter equivalent, cocoa butter substitute, etc. In addition, many chocolate or chocolate-like products comprise cocoa powder or cocoa mass, although some chocolate or chocolate-like products, such as typical white chocolates, may be produced without cocoa powder, but e.g. drawing its chocolate taste from cocoa butter. Depending on the country and/or region there may be various restrictions on which products may be marketed as chocolate.

The term "comprising" or "to comprise" is to be interpreted as specifying the presence of the stated parts, steps, features, or components, but does not exclude the presence of one of more additional parts, steps, features, or components.

By a "compound comprising a fat mixture comprising cocoa butter and the fat composition, wherein the compound comprises e.g. 20 to 50 wt % of the fat mixture and wherein the fat mixture comprises e.g. 1 to 20% cocoa butter and 80 to 99% fat composition" is meant that the compound comprises between 20 and 50 wt % fat mixture, and of the total weight of this fat mixture 1 to 20% is from cocoa butter and the rest of the fat mixture is from the fat composition. An example could be that the compound comprises 30 wt % fat mixture, of which 8% is fat from cocoa butter, meaning that the rest of the fat mixture, i.e. 92%, is the fat composition, giving a total of 100%. Comprised in the fat composition could also be milk fat and hence the fat mixture could also comprise milk fat.

As used herein, the term "triglycerides" may be used interchangeably with the term "triacylglycerides" and should be understood as an ester derived from glycerol and three fatty acids. "Triglycerides" may be abbreviated TG or TAG. A single triglyceride molecule, having a specific molecular formula, is of either vegetable or non-vegetable origin. Some triglycerides, like for example StOSt-triglycerides, may be obtained from both vegetable and/or non-vegetable sources. Thus, a fat phase comprising StOSt-triglycerides, may comprise StOSt-triglycerides obtained solely from vegetable sources, or StOSt-triglycerides obtained solely from non-vegetable sources, or a combination thereof, i.e. said fat phase may comprise some StOSt-triglyceride molecules obtained from vegetable sources and some StOSt-triglycerides molecules obtained from non-vegetable sources.

As used herein, "vegetable oil" and "vegetable fat" is used interchangeably, unless otherwise specified. As used herein, the term "vegetable" shall be understood as originating from a plant retaining its original chemical structure/composition. Thus, vegetable fat or vegetable triglycerides are still to be understood as vegetable fat or vegetable triglycerides after fractionation etc. as long as the chemical structure of the fat components or the triglycerides are not altered. When vegetable triglycerides are for example transesterified they are no longer to be understood as a vegetable triglyceride in the present context.

Similarly, the term "non-vegetable" in the context of "non-vegetable triglyceride" or "non-vegetable fat" when used herein is intended to mean obtained from other sources than native vegetable oils or fractions thereof, or obtained after transesterification. Examples of non-vegetable triglycerides may for example be, but are not limited to, triglycerides obtained from animal fat, and/or transesterification.

As used herein the term "single cell oil" shall mean oil from oleaginous microorganisms, which are species of yeasts, molds (fungal), bacteria, or microalgae. These single cell oils are produced intracellular in the stationary growth phase under specific growth conditions (e.g. under nitrogen limitation with simultaneous excess of a carbon source). Examples of oleaginous microorganisms are, but not limited to; fungi—*Mucor* and *Mortierella* (various species, e.g. *M. alpina*); oleaginous yeast—*Yarrowia lipolytica*; Algea—Schizochytrium, *Nannochloropsis, Chlorella* (various species); Dinoflagellate microalgae—*Crypthecodinium cohnii*; Marine bacteria—*Shewanella*.

In this context, the term "bloom resistance" refers to a property of the chocolate to resist bloom formation. Increased or improved bloom resistance in a chocolate in the present context thus implies that the chocolate has a higher resistance towards blooming, which can be observed as a white/grey fat layer on the surface.

DETAILED DESCRIPTION OF THE INVENTION

When describing the below embodiments, the present invention envisages all possible combinations and permutations of the below described embodiments with the above disclosed aspects.

The invention relates to a fat composition comprising saturated fatty acids, 0 to 25 wt % C4-C14 fatty acids, 0 to 5 wt % trans unsaturated fatty acids, 0 to 20 wt % tri-saturated triglycerides, 1 to 20 wt % symmetrical OStO triglycerides, 45 to 99 wt % $Sat_2O$ triglycerides selected from StStO, StOSt, POP, PPO, POSt, StPO and/or PStO, and the ratio (StStO+PPO+StPO+PStO)/(StOSt+POP+POSt) is at least 0.7.

The fat composition may contain up to 10 wt % minor components like free fatty acids, mono- and/or di-glycerides. The given weight amounts in the fat composition is calculated from a composition containing approximately 100% triglycerides, however compositions containing up to 10 wt % mono- and/or diglycerides may also be included.

In one or more embodiments, the fat composition does not comprise any milk fat.

The fat composition can in one or more embodiments further comprise milk fat. In one embodiment the content of milk fat is 30 wt % or less of the total fat content, such as 20 wt % or less of the total fat content, such as 15 wt % or less of the total fat content, such as 10 wt % or less of the total fat content. In one embodiment the content of milk fat is between 0 and 20 wt % of the total fat content, such as between 0 and 15 wt % of the total fat content, such as between 0 and 10 wt % of the total fat content, such as between 0 and 5 wt % of the total fat content.

In one or more embodiments, at least 60 wt % is saturated acids, such as at least 70 wt % is saturated acids, such as at least 80 wt % is saturated acids, or such as at least 90 wt % is saturated acids.

In one or more embodiments, at least 55 wt % is saturated acids, such as at least 65 wt % is saturated acids, such as at least 75 wt % is saturated acids, or such as at least 85 wt % is saturated acids.

In one or more embodiments, 0 to 20 wt % is C4-C14 fatty acids, such as 0 to 10 wt % is C4-C14 fatty acids, or such as 0 to 5 wt % is C4-C14 fatty acids.

Using a higher amount of lauric fatty acids (C12:0) has the disadvantages of a lower cocoa butter tolerance, and a potential risk of soapy off flavor.

In one or more embodiments, 0.5 to 25 wt % is C4-C14 fatty acids, such as 0.5 to 20 wt % is C4-C14 fatty acids such as 0.5 to 10 wt % is C4-C14 fatty acids, or such as 0.5 to 5 wt % is C4-C14 fatty acids.

In one or more embodiments, 1 to 10 wt % is C4-C14 fatty acids, such as 1 to 5 wt % is C4-C14 fatty acids, such as 1.5 to 4 wt % is C4-C14 fatty acids, or such as 1.5 to 3 wt % is C4-C14 fatty acids.

In one or more embodiments, 2 to 3 wt % is C4-C14 fatty acids.

In one or more embodiments, 0 to 4 wt % is trans unsaturated fatty acids, such as 0 to 3 wt % is trans unsaturated fatty acids, or such as 0 to 2 wt % is trans unsaturated fatty acids.

In one or more embodiments, 0.2 to 4 wt % is trans unsaturated fatty acids, such as 0.2 to 3 wt % is trans unsaturated fatty acids, or such as 0.2 to 2 wt % is trans unsaturated fatty acids.

In one or more embodiments, 0.2 to 2.0 wt % is trans unsaturated fatty acids

In one or more embodiments, 0.2 to 1.0 wt % is trans unsaturated fatty acids

In one or more embodiments, 0 to 15 wt % is tri-saturated triglycerides, such as 0 to 10 wt % is tri-saturated triglycerides, or such as 0 to 8 wt % is tri-saturated triglycerides.

In one or more embodiments, 0.5 to 15 wt % is tri-saturated triglycerides, such as 0.5 to 10 wt % is tri-saturated triglycerides, or such as 0.5 to 8 wt % is tri-saturated triglycerides.

In one or more embodiments, 2 to 10 wt % is tri-saturated triglycerides.

In one or more embodiments, 5 to 10 wt % is tri-saturated triglycerides.

In one or more embodiments, 1 to 15 wt % is symmetrical OStO triglycerides, such as 1 to 10 wt % is symmetrical OStO triglycerides, such as 1 to 8 wt % is symmetrical OStO triglycerides, such as 1 to 5 wt % is symmetrical OStO triglycerides, such as 1 to 4 wt % is symmetrical OStO triglycerides, such as 1 to 3 wt % is symmetrical OStO triglycerides, or such as 1 to 2 wt % is symmetrical OStO triglycerides.

In one or more embodiments, 2 to 15 wt % is symmetrical OStO triglycerides, such as 3 to 15 wt % is symmetrical OStO triglycerides, such as 4 to 15 wt % is symmetrical OStO triglycerides, or such as 5 to 15 wt % is symmetrical OStO triglycerides.

In one or more embodiments, 2 to 10 wt % is symmetrical OStO triglycerides.

In one or more embodiments, 5 to 10 wt % is symmetrical OStO triglycerides.

From the examples it is shown that the compound based on fat blend B with a high cocoa butter content (compound V) shows a significant longer bloom stability than the reference fat blends A and C (compound IV and VI) for the molded bars at 15° C.

At 20° C. storage, the same tendency can be seen for the coated biscuits. It is believed that the reason for this great difference in bloom stability between the different fat blends is a co-crystallization between OStO and the symmetric triglycerides in cocoa butter. This co-crystallization will inhibit the symmetric triglycerides in cocoa butter to re-crystalize at lower temperatures. Fat blend B has more than four times the amount of OStO when compared to that of the two reference fat blends A and C. Adding more cocoa butter to the recipe in table 2 in the examples will make it necessary to add an even higher amount of OStO. It is expected that at the 10.4% cocoa butter level a higher addition of OStO would have improved the bloom stability even more. The amount of added OStO may therefore be a tradeoff between the required bloom stability and the amount of required cocoa butter in the recipe.

In one or more embodiments, 45 to 90 wt % is $Sat_2O$ triglycerides selected from StStO, StOSt, POP, PPO, POSt, StPO and/or PStO, such as 45 to 80 wt % is $Sat_2O$ triglycerides selected from StStO, StOSt, POP, PPO, POSt, StPO and/or PStO, such as 45 to 75 wt % is $Sat_2O$ triglycerides selected from StStO, StOSt, POP, PPO, POSt, StPO and/or PStO, or such as 45 to 70 wt % is $Sat_2O$ triglycerides selected from StStO, StOSt, POP, PPO, POSt, StPO and/or PStO In one or more embodiments, 50 to 90 wt % is $Sat_2O$ triglycerides selected from StStO, StOSt, POP, PPO, POSt, StPO and/or PStO, such as 50 to 85 wt % is $Sat_2O$ triglycerides selected from StStO, StOSt, POP, PPO, POSt, StPO and/or PStO such as 50 to 80 wt % is $Sat_2O$ triglycerides selected from StStO, StOSt, POP, PPO, POSt, StPO and/or PStO, or such as 50 to 75 wt % is $Sat_2O$ triglycerides selected from StStO, StOSt, POP, PPO, POSt, StPO and/or PStO.

It is preferred to have a $Sat_2O$ content relatively close to the $Sat_2O$ content found in standard chocolate composition to try to ensure a similarly nice and fast melting and feeling as is associated with chocolate.

In one or more embodiments, 50 to 60 wt % is $Sat_2O$ triglycerides selected from StStO, StOSt, POP, PPO, POSt, StPO and/or PStO.

In one or more embodiments, the ratio (StStO+PPO+StPO+PStO)/(StOSt+POP+POSt) is at least 0.8.

In one or more embodiments, the ratio (StStO+PPO+StPO+PStO)/(StOSt+POP+POSt) is at least 1.0.

In one or more embodiments, the ratio (StStO+PPO+StPO+PStO)/(StOSt+POP+POSt) is at least 1.2.

In one or more embodiments, the ratio (StStO+PPO+StPO+PStO)/(StOSt+POP+POSt) is at least 1.5.

In one or more embodiments, the ratio (StStO+PPO+StPO+PStO)/(StOSt+POP+POSt) is at least 1.8.

In one or more embodiments, the ratio (StStO+PPO+StPO+PStO)/(StOSt+POP+POSt) is in the range of 0.7 to 10.

In one or more embodiments, the ratio (StStO+PPO+StPO+PStO)/(StOSt+POP+POSt) is in the range of 1 to 5.

In one or more embodiments, the ratio (StStO+PPO+StPO+PStO)/(StOSt+POP+POSt) is in the range of 1.5 to 5.

In one or more embodiments, the ratio (StStO+PPO+StPO+PStO)/(StOSt+POP+POSt) is in the range of 1.5 to 3.

The present invention also relates to a compound comprising a fat mixture comprising cocoa butter and the fat composition according to the present disclosure, wherein the compound comprises 20 to 50 wt % of the fat mixture and wherein the fat mixture comprises 1 to 20% cocoa butter and 80 to 99% fat composition.

In one or more embodiments, the compound comprises 20 to 40 wt % of the fat mixture.

In one or more embodiments, the fat mixture comprises 1 to 15% cocoa butter and 85 to 99% fat composition.

In one or more embodiments, the fat mixture comprises 5 to 15% cocoa butter and 85 to 95% fat composition.

In one or more embodiments, the compound may further comprise vegetable fat and/or single cell oil in small amount, e.g. such as up to 15 wt %.

When describing the embodiments, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisage all possible combinations and permutations of the described embodiments.

The present invention is further illustrated by the following example, which are not to be construed as limiting the scope of protection.

EXAMPLE

In the examples, 15° C., 20° C. and 23° C. isothermal storage are used as representative temperatures.

Three different fat compositions were blended. These are shown in table 1.

TABLE 1

|  | Fat A | Fat B | Fat C | Methods |
|---|---|---|---|---|
| OStO | 0.30 | 1.26 | 0.24 | * |
| OPO | 2.00 | 2.06 | 1.43 |  |
| Sum C4-C14 fatty acids | 2.40 | 2.04 | 1.2 | IUPAC 2.301 and 2.304 |
| Sum trans fatty acids | 0.50 | 0.43 | 2.8 | IUPAC 2.301 and 2.304 |
| Sum tri saturated TAGs | 8.70 | 7.46 | 7.7 | AOCS Ce 5b-89 ** |
| Ratio (StStO + PPO + StPO + PStO)/(StOSt + POP + POSt) | 2 | 2 | 2 | * |
| Sum StStO, StOSt, POP, PPO, POSt, StPO and/or PStO | 59.70 | 52.54 | 66.51 | AOCS Ce 5b-89 ** |

* The analysis can be done by any known method by a commercial laboratory.
** The % amount of a triglyceride (TAG) is determined using the AOCS Ce 5b-89 method which is a standard method for determining triglycerides in vegetable oils by HPLC.

The three different fat compositions from table 1 were used to produce six different compounds with two different amounts of cocoa butter contents. These six compounds are shown in table 2.

TABLE 2

| All amounts are in wt % | Compounds | | | | | |
|---|---|---|---|---|---|---|
|  | I | II | III | IV | V | VI |
| Sugar | 47.9 | 47.9 | 47.9 | 47.9 | 47.9 | 47.9 |
| Cocoa powder (11%) | 14.25 | 14.25 | 14.25 | 14.25 | 14.25 | 14.25 |
| Skim milk powder | 5.7 | 5.7 | 5.7 | 5.7 | 5.7 | 5.7 |
| Lecithin | 0.40 | 0.40 | 0.40 | 0.40 | 0.40 | 0.40 |
| Cocoa butter | 0.00 | 0.00 | 0.00 | 1.90 | 1.90 | 1.90 |
| Fat A | 31.75 | 0.0 | 0.0 | 29.85 | 0.0 | 0.0 |
| Fat B | 0.0 | 31.75 | 0.0 | 0.0 | 29.85 | 0.0 |
| Fat C | 0.0 | 0.0 | 31.75 | 0.0 | 0.0 | 29.85 |
| Total fat content | 33.32 | 33.32 | 33.32 | 33.32 | 33.32 | 33.32 |
| Cocoa butter content of total fat content* | 4.70 | 4.70 | 4.70 | 10.4 | 10.4 | 10.4 |

*Note:
Some of the fat content in the fat composition is from cocoa powder.

For each mixture, after mixing all ingredients from table 2, except lecithin and some of the fat, the mixture is mixed on a Teddy mixer with heat jacket to a consistence of marcipan. Afterwards, every mixture is refined on a three rolls Buhler refiner to an average particle size at 20 micron. All six mixtures are dry chonced for three hours before the remaining fat is added, and then followed by a wet chonching for three hours. A half hour before choncing is finished lecithin is added.

The compounds are cooled down to 45° C. and used for coating of biscuits and molded bars. Both coated biscuits and molded bars are cooled in a Blumen three zones cooling tunnel for 30 minutes. Temperatures are adjusted to 15° C. in zone 1 and 3 and 12° C. in zone 2. The molded bars and the coated biscuits are kept at 20° C. for a week and then moved to 15° C., 20° C., and 23° C. cabinets for isothermal storage.

It is desired to avoid strong bloom formation, because the consumer reacts by rejecting the product with bloom as a poor product of inferior quality. Every week all products are evaluated for visible bloom by a trained panel of experts and when strong visible bloom is evaluated, the number of days are noted down as the shelf life results. The results are shown in table 3, which shows the different compounds shelf life before strong bloom appears.

TABLE 3

| Application | Storage | Compounds (days before strong bloom) | | | | | |
|---|---|---|---|---|---|---|---|
|  |  | I | II | III | IV | V | VI |
| Molded bars | 15° C. | >305 | >305 | >305 | 250 | >305 | 255 |
|  | 20° C. | >305 | >305 | >305 | >305 | >305 | >305 |
|  | 23° C. | >305 | >305 | >305 | >305 | >305 | >305 |
| Coated biscuits | 15° C. | >305 | >305 | >305 | 28 | 56 | 32 |
|  | 20° C. | >305 | >305 | >305 | 238 | >305 | 235 |
|  | 23° C. | >305 | >305 | >305 | >305 | >305 | >305 |

Compound IV, V, and VI has more than the double content of cocoa butter in its fat phase compared to compound I, II, and III. It is known that more than 4 to 6 wt % cocoa butter in a compound's fat composition decreases the bloom stability significant, especially at lower storage temperatures, such as at or below 20° C. Table 3 shows exactly this well-known phenomena, as it is observed that compounds I, II, and III (the three fat compositions with just 4.7 wt % cocoa butter) all has a very long bloom stability at all storage temperatures. If this is compared to the three compounds made with a cocoa butter content of 10.4% (compound IV, V and VI), a significant difference in bloom stability at e.g. 15° C. storage is observed for both the coated biscuits and the molded bars.

The compound based on fat blend B with a high cocoa butter content (compound V) shows a significant longer bloom stability than the reference fat blends A and C (compound IV and VI) for the molded bars at 15° C.

At 20° C. storage, the same tendency can be seen for the coated biscuits. It is believed that the reason for this great difference in bloom stability between the different fat blends is a co-crystallization between OStO and the symmetric triglycerides in cocoa butter. This co-crystallization will inhibit the symmetric triglycerides in cocoa butter to re-crystalize at lower temperatures. Fat blend B has more than four times the amount of OStO when compared to that of the two reference fat blends A and C. Adding more cocoa butter to the recipe in table 2 will make it necessary to add an even higher amount of OstO. It is expected that at the 10.4% cocoa butter level a higher addition of OStO would have improved the bloom stability even more. The amount of added OStO may therefore be a tradeoff between the required bloom stability and the amount of required cocoa butter in the recipe.

The invention is further described in the following non-limiting items.

1. A fat composition comprising at least 50 wt % saturated (Sat) fatty acids, and wherein in the fat composition:
   a) 0 to 25 wt % is C4-C14 fatty acids,
   b) 0 to 5 wt % is trans unsaturated fatty acids,
   c) 0 to 20 wt % is tri-saturated triglycerides (SatSatSat),
   d) 1 to 20 wt % is symmetrical OStO triglycerides, e) 45 to 99 wt % is Sat$_2$O triglycerides selected from StStO, StOSt, POP, PPO, POSt, StPO and/or PStO, and
f) the ratio (StStO+PPO+StPO+PStO)/(StOSt+POP+POSt) is at least 0.7.
2. The fat composition according to item 1 wherein at least 60 wt % is saturated acids.
3. The fat composition according to any of the proceeding items wherein at least 70 wt % is saturated acids.
4. The fat composition according to any of the proceeding items wherein at least 80 wt % is saturated acids.
5. The fat composition according to any of the proceeding items wherein at least 90 wt % is saturated acids.
6. The fat composition according to any of the proceeding items wherein 0 to 20 wt % is C4-C14 fatty acids.
7. The fat composition according to any of the proceeding items wherein 0 to 10 wt % is C4-C14 fatty acids.
8. The fat composition according to any of the proceeding items wherein 0 to 5 wt % is C4-C14 fatty acids.
9. The fat composition according to any of the proceeding items wherein 0.5 to 25 wt % is C4-C14 fatty acids.
10. The fat composition according to any of the proceeding items wherein 0.5 to 20 wt % is C4-C14 fatty acids.
11. The fat composition according to any of the proceeding items wherein 0.5 to 10 wt % is C4-C14 fatty acids.
12. The fat composition according to any of the proceeding items wherein 0.5 to 5 wt % is C4-C14 fatty acids.
13. The fat composition according to any of the proceeding items wherein 1 to 10 wt % is C4-C14 fatty acids.
14. The fat composition according to any of the proceeding items wherein 1 to 5 wt % is C4-C14 fatty acids.
15. The fat composition according to any of the proceeding items wherein 1.5 to 4 wt % is C4-C14 fatty acids.
16. The fat composition according to any of the proceeding items wherein 1.5 to 3 wt % is C4-C14 fatty acids.
17. The fat composition according to any of the proceeding items wherein 2 to 3 wt % is C4-C14 fatty acids.
18. The fat composition according to any of the proceeding items wherein 0 to 4 wt % is trans unsaturated fatty acids.
19. The fat composition according to any of the proceeding items wherein 0 to 3 wt % is trans unsaturated fatty acids.
20. The fat composition according to any of the proceeding items wherein 0 to 2 wt % is trans unsaturated fatty acids.
21. The fat composition according to any of the proceeding items wherein 0.2 to 4 wt % is trans unsaturated fatty acids.
22. The fat composition according to any of the proceeding items wherein 0.2 to 3 wt % is trans unsaturated fatty acids.
23. The fat composition according to any of the proceeding items wherein 0.2 to 2 wt % is trans unsaturated fatty acids.
24. The fat composition according to any of the proceeding items wherein 0 to 15 wt % is tri-saturated triglycerides.
25. The fat composition according to any of the proceeding items wherein 0 to 10 wt % is tri-saturated triglycerides.
26. The fat composition according to any of the proceeding items wherein 0 to 8 wt % is tri-saturated triglycerides.
27. The fat composition according to any of the proceeding items wherein 0.5 to 15 wt % is tri-saturated triglycerides.
28. The fat composition according to any of the proceeding items wherein 0.5 to 10 wt % is tri-saturated triglycerides.
29. The fat composition according to any of the proceeding items wherein 0.5 to 8 wt % is tri-saturated triglycerides.
30. The fat composition according to any of the proceeding items wherein 2 to 10 wt % is tri-saturated triglycerides.
31. The fat composition according to any of the proceeding items wherein 5 to 10 wt % is tri-saturated triglycerides.
32. The fat composition according to any of the proceeding items wherein 1 to 15 wt % is symmetrical OStO triglycerides.
33. The fat composition according to any of the proceeding items wherein 1 to 10 wt % is symmetrical OStO triglycerides.
34. The fat composition according to any of the proceeding items wherein 1 to 8 wt % is symmetrical OStO triglycerides.
35. The fat composition according to any of the proceeding items wherein 1 to 5 wt % is symmetrical OStO triglycerides.
36. The fat composition according to any of the proceeding items wherein 1 to 4 wt % is symmetrical OStO triglycerides.
37. The fat composition according to any of the proceeding items wherein 1 to 3 wt % is symmetrical OStO triglycerides.
38. The fat composition according to any of the proceeding items wherein 1 to 2 wt % is symmetrical OStO triglycerides.
39. The fat composition according to any of the proceeding items wherein 2 to 15 wt % is symmetrical OStO triglycerides.
40. The fat composition according to any of the proceeding items wherein 3 to 15 wt % is symmetrical OStO triglycerides.
41. The fat composition according to any of the proceeding items wherein 4 to 15 wt % is symmetrical OStO triglycerides.
42. The fat composition according to any of the proceeding items wherein 5 to 15 wt % is symmetrical OStO triglycerides.
43. The fat composition according to any of the proceeding items wherein 2 to 10 wt % is symmetrical OStO triglycerides.
44. The fat composition according to any of the proceeding items wherein 5 to 10 wt % is symmetrical OStO triglycerides.
45. The fat composition according to any of the proceeding items wherein 45 to 90 wt % is Sat$_2$O triglycerides selected from StStO, StOSt, POP, PPO, POSt, StPO and/or PStO.
46. The fat composition according to any of the proceeding items wherein 45 to 80 wt % is Sat$_2$O triglycerides selected from StStO, StOSt, POP, PPO, POSt, StPO and/or PStO.
47. The fat composition according to any of the proceeding items wherein 45 to 75 wt % is Sat$_2$O triglycerides selected from StStO, StOSt, POP, PPO, POSt, StPO and/or PStO.
48. The fat composition according to any of the proceeding items wherein 45 to 70 wt % is Sat$_2$O triglycerides selected from StStO, StOSt, POP, PPO, POSt, StPO and/or PStO.

49. The fat composition according to any of the proceeding items wherein 50 to 90 wt % is $Sat_2O$ triglycerides selected from StStO, StOSt, POP, PPO, POSt, StPO and/or PStO.
50. The fat composition according to any of the proceeding items wherein 50 to 85 wt % is $Sat_2O$ triglycerides selected from StStO, StOSt, POP, PPO, POSt, StPO and/or PStO.
51. The fat composition according to any of the proceeding items wherein 50 to 80 wt % is $Sat_2O$ triglycerides selected from StStO, StOSt, POP, PPO, POSt, StPO and/or PStO.
52. The fat composition according to any of the proceeding items wherein 50 to 75 wt % is $Sat_2O$ triglycerides selected from StStO, StOSt, POP, PPO, POSt, StPO and/or PStO.
53. The fat composition according to any of the proceeding items wherein 50 to 60 wt % is $Sat_2O$ triglycerides selected from StStO, StOSt, POP, PPO, POSt, StPO and/or PStO.
54. The fat composition according to any of the proceeding items wherein the ratio (StStO+PPO+StPO+PStO)/(StOSt+POP+POSt) is at least 0.8.
55. The fat composition according to any of the proceeding items wherein the ratio (StStO+PPO+StPO+PStO)/(StOSt+POP+POSt) is at least 1.0.
56. The fat composition according to any of the proceeding items wherein the ratio (StStO+PPO+StPO+PStO)/(StOSt+POP+POSt) is at least 1.2.
57. The fat composition according to any of the proceeding items wherein the ratio (StStO+PPO+StPO+PStO)/(StOSt+POP+POSt) is at least 1.5.
58. The fat composition according to any of the proceeding items wherein the ratio (StStO+PPO+StPO+PStO)/(StOSt+POP+POSt) is at least 1.8.
59. The fat composition according to any of the proceeding items wherein in the fat composition:
    a) 2 to 3 wt % is C4-C14 fatty acids,
    b) 0.2 to 1 wt % is trans unsaturated fatty acids,
    c) 5 to 10 wt % is tri-saturated triglycerides (SatSatSat),
    d) 1 to 2 wt % is symmetrical OStO triglycerides,
    e) 50 to 60 wt % is $Sat_2O$ triglycerides selected from StStO, StOSt, POP, PPO, POSt, StPO and/or PStO, and
    f) the ratio (StStO+PPO+StPO+PStO)/(StOSt+POP+POSt) is at least 1.8.
60. The fat composition according to any of the proceeding items wherein the fat composition comprises milk fat in the amount of 30 wt % or less of the total fat content.
61. The fat composition according to any of the proceeding items wherein the fat composition comprises milk fat in the amount of 20 wt % or less of the total fat content.
62. The fat composition according to any of the proceeding items wherein the fat composition comprises milk fat in the amount of 15 wt % or less of the total fat content.
63. The fat composition according to any of the proceeding items wherein the fat composition comprises milk fat in the amount of 10 wt % or less of the total fat content.
64. A compound comprising a fat mixture comprising cocoa butter and the fat composition according to any of items 1-63, wherein the compound comprises 20 to 50 wt % of the fat mixture and wherein the fat mixture comprises 1 to 20% cocoa butter and 80 to 99% fat composition.
65. The compound according to item 64, wherein the fat mixture comprises 1 to 15% cocoa butter and 85 to 99% fat composition.
66. The compound according to item 64, wherein the fat mixture comprises 5 to 15% cocoa butter and 85 to 95% fat composition.
67. The compound according to item 64, wherein the compound comprises 20 to 40 wt % of the fat mixture and wherein the fat mixture comprises 1 to 20% cocoa butter and 80 to 99% fat composition.
68. The compound according to item 67, wherein the fat mixture comprises 1 to 15% cocoa butter and 85 to 99% fat composition.
69. The compound according to item 67, wherein the fat mixture comprises 5 to 15% cocoa butter and 85 to 95% fat composition.
70. The compound according to any of items 64-69, wherein the compound is a coating compound or a chocolate-like compound.
71. Use of a fat composition according to any one of items 1 to 63 for the manufacture of a processed food product for human consumption.
72. Use of a fat composition according to any one of items 1 to 63 as an ingredient in a confectionary product.
73. Use of a fat composition according to any one of items 1 to 63 as an ingredient in coating compounds for a confectionary product.
74. Use of a fat composition according to any one of items 1 to 63 as an ingredient in a chocolate-like product.

The invention claimed is:
1. A fat composition comprising at least 50 wt % saturated (Sat) fatty acids, and wherein in the fat composition:
    a) 0 to 25 wt % is C4-C14 fatty acids,
    b) 0 to 5 wt % is trans unsaturated fatty acids,
    c) 0 to 20 wt % is tri-saturated triglycerides (SatSatSat),
    d) 1 to 20 wt % is symmetrical OStO triglycerides,
    e) 45 to 99 wt % is Sat2O triglycerides selected from StStO, StOSt, POP, PPO, POSt, StPO, and/or PStO, and
    f) the ratio (StStO+PPO+StPO+PStO)/(StOSt+POP+POSt) is at least 0.7.
2. The fat composition according to claim 1, wherein at least 60 wt % is saturated fatty acids.
3. The fat composition according to claim 1, wherein 0 to 20 wt % is C4-C14 fatty acids.
4. The fat composition according to claim 1, wherein 0 to 4 wt % is trans unsaturated fatty acids.
5. The fat composition according to claim 1, wherein 0 to 15 wt % is tri-saturated triglycerides.
6. The fat composition according to claim 1, wherein 1 to 15 wt % is symmetrical OStO triglycerides.
7. The fat composition according to claim 1, wherein 45 to 90 wt % is Sat2O triglycerides selected from StStO, StOSt, PPO, POP, POSt, StPO, and/or PStO.
8. The fat composition according to claim 1, wherein the ratio (StStO+PPO +StPO+PStO)/(StOSt+POP+POSt) is at least 0.8.
9. The fat composition according to claim 1, wherein in the fat composition:
    a) 2 to 3 wt % is C4-C14 fatty acids,
    b) 0.2 to 1 wt % is trans unsaturated fatty acids,
    c) 5 to 10 wt % is tri-saturated triglycerides (SatSatSat),
    d) 1 to 2 wt % is symmetrical OStO triglycerides, e) 50 to 60 wt % is $Sat_2O$ triglycerides selected from StStO, StOSt, POP, PPO, POSt, StPO, and/or PStO, and f) the ratio (StStO+PPO+StPO+PStO)/(StOSt+POP+POSt) is at least 1.8.

10. A compound comprising a fat mixture comprising cocoa butter and the fat composition according to claim 1, wherein the compound comprises 20 to 50 wt % of the fat mixture and wherein the fat mixture comprises 1 to 20% cocoa butter and 80 to 99% fat composition.

11. The compound according to claim 10, wherein the compound comprises 20 to 40 wt % of the fat mixture and wherein the fat mixture comprises 1 to 20% cocoa butter and 80 to 99% fat composition.

12. A compound according to claim 10, wherein the compound is a coating compound or a chocolate-like compound.

13. The fat composition according to claim 1, wherein the fat composition is used for the manufacture of a processed food product for human consumption.

14. The fat composition according to claim 1, wherein the fat composition is used as an ingredient in a confectionary product.

15. The fat composition according to claim 1, wherein the fat composition is used as an ingredient in coating compounds for a confectionary product.

16. The fat composition according to claim 1, wherein the fat composition is used as an ingredient in a chocolate-like product.

* * * * *